(12) United States Patent
Ishii et al.

(10) Patent No.: US 9,598,079 B2
(45) Date of Patent: Mar. 21, 2017

(54) ENGINE CONTROL DEVICE

(71) Applicant: Toyota Jidosha Kabushiki Kaisha, Toyota-shi Aichi-ken (JP)

(72) Inventors: Kenichi Ishii, Miyoshi (JP); Hiroto Miura, Toyota (JP); Hideki Ohashi, Chiryu (JP); Yosuke Yamashita, Nagoya (JP); Masataka Okuda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 26 days.

(21) Appl. No.: 14/735,619

(22) Filed: Jun. 10, 2015

(65) Prior Publication Data
US 2015/0360689 A1 Dec. 17, 2015

(30) Foreign Application Priority Data
Jun. 11, 2014 (JP) ................. 2014-120969

(51) Int. Cl.
*B60G 17/00* (2006.01)
*B62C 3/00* (2006.01)
*G06F 7/00* (2006.01)
*B60W 30/18* (2012.01)
*B60W 10/22* (2006.01)
(Continued)

(52) U.S. Cl.
CPC ............ *B60W 30/18* (2013.01); *B60W 10/06* (2013.01); *B60W 10/22* (2013.01); *F02N 11/0833* (2013.01); *F02N 2200/0801* (2013.01); *F02N 2200/101* (2013.01); *F02N 2200/102* (2013.01); *Y02T 10/48* (2013.01)

(58) Field of Classification Search
CPC combination set(s) only.
See application file for complete search history.

(56) References Cited

U.S. PATENT DOCUMENTS

| 4,349,077 A * | 9/1982 | Sekiguchi ............ B60G 17/018 180/41 |
| 2002/0193930 A1* | 12/2002 | Matsubara ............ B60W 10/06 701/54 |
| 2011/0004396 A1 | 1/2011 | Yamaguchi |

FOREIGN PATENT DOCUMENTS

| JP | 59-117511 U | 8/1984 |
| JP | 09-323524 A | 12/1997 |
| JP | 2006-329122 A | 12/2006 |

(Continued)

*Primary Examiner* — Bhavesh V Amin
(74) *Attorney, Agent, or Firm* — Dinsmore & Shohl LLP

(57) ABSTRACT

The engine control device is applied to a vehicle equipped with a suspension control device for driving stepping motors for changing damping forces of shock absorbers. The suspension control device performs an initializing process for resolving the step-out of the stepping motors by driving the stepping motors when an initialization performing condition is satisfied. The engine control device continues the engine operation when a signal for inhibiting the automatic stop of the operation of the engine is sent to the engine control device and the engine control device judges that no malfunction occurs in the suspension control device even if the engine stop condition is satisfied. The engine control device automatically stops the operation of the engine when the engine stop condition is satisfied and the engine control device judges that a malfunction occurs in the suspension control device even if the signal is sent to the engine control device.

18 Claims, 7 Drawing Sheets

(51) Int. Cl.
*B60W 10/06* (2006.01)
*F02N 11/08* (2006.01)

(56) References Cited

FOREIGN PATENT DOCUMENTS

| | | |
|---|---|---|
| JP | 4356142 B | 11/2009 |
| JP | 2010-064582 A | 3/2010 |
| JP | 2011-012594 A | 1/2011 |
| JP | 2013-036343 A | 2/2013 |

* cited by examiner (SIRS: Stop Inhibition Requesting SIgnal)

(SIRS: Stop Inhibition Requesting SIgnal)

ENGINE CONTROL DEVICE

BACKGROUND ART

Field of the Invention

The invention relates to an engine control device applied to a vehicle comprising a suspension control device and an internal combustion engine and capable to automatically stop an operation of the engine and start the operation of the engine (restart the operation of the engine).

Description of Related Art

Conventionally, a suspension control device is known. The suspension control device electrically controls a suspension property of a vehicle such as a vehicle height and a damping force of a shock absorber. The suspension control device includes an actuator. The actuator is, for example, a stepping motor for changing a damping force of a shock absorber for damping the vibration of a vehicle body by increasing and/or decreasing the opening degree of a damping force control valve of the shock absorber. Such a shock absorber may get a situation where a damping force of the shock absorber based on a command value from a suspension control device to a stepping motor is not consistent with an actual damping force of the shock absorber. Such a situation is referred to as a "step-out." When a step-out occurs, it may lead to a problem such as degradation of a ride quality of a vehicle, for example.

Accordingly, one of the conventional techniques resolves a step-out by outputting a command value which exceeds an upper or lower limit of a control range when a command value for an actuator (for example, stepping motor) of a shock absorber corresponds to the upper or lower limit (for example, refer to JP 2010-064582 A). Thereby, a step-out can be resolved in a short time and unpleasant sensation that a passenger feels while the step-out is being resolved can be minimized.

On the other hand, in recent years, a device for improving the fuel consumption of the engine by automatically stopping the operation of the engine when a predetermined engine operation stop condition is satisfied (that is, the automatic stop and start control device of the engine) has been employed (for example, refer to JP 2006-329122 A and JP 2013-036343 A). Hereinafter, the automatic stop and start control device of the engine may be simply referred to as "the engine control device".

SUMMARY OF THE INVENTION

By the way, a predetermined voltage and electrical energy is required to drive an electrical actuator of a suspension control device. Especially, in order to assuredly perform an initializing process for resolving a step-out of a stepping motor of a shock absorber as mentioned above (may be referred to as an "initialization" or "refreshment"), it is necessary to maintain a battery voltage (power source voltage) of a vehicle at the predetermined voltage or more. Accordingly, in order to assuredly perform this initializing process, it is desired that the operation of an engine continues so as to make an alternator generate power even when the engine operation stop condition is satisfied.

Accordingly, the inventors of this application has realized that it is preferred to send a signal for requesting to inhibit the stop of the operation of the engine to the engine control device when the suspension control device drives the actuator and the engine control device continues the operation of the engine when the engine control device receives the signal. Hereinafter, the signal for requesting to inhibit the stop of the engine operation may be simply referred to as a "stop inhibition requesting signal."

However, when the suspension control device continues to generate the stop inhibition requesting signal due to any reason (for example, due to a malfunction occurring in a CPU), the engine control device cannot stop the operation of the engine even when an engine operation stop condition is satisfied and thus, the problem such as the increasing of the fuel consumption of the engine occurs.

The invention is made for solving the problem described above. Namely, one of the objects of the invention is to provide an engine control device which can stop the operation of the engine when the engine operation stop condition is satisfied in a case where a malfunction occurs in the suspension control device, even if the suspension control device sends the stop inhibition requesting signal.

An engine control device according to the invention for accomplishing the object described above is applied to a vehicle equipped with:

a stepping motor for changing a damping force of a shock absorber which a suspension of the vehicle comprises by increasing and/or decreasing the opening degree of a damping force control valve of the shock absorber;

a suspension control device for driving the stepping motor, which performs an initializing process for resolving a step-out of the stepping motor by driving the stepping motor when a predetermined initialization performing condition is satisfied; and an internal combustion engine.

Hereinafter, the engine control device according to the invention may be referred to as "the invention device."

Further, the invention device comprises an engine control part programmed to:

automatically stop the operation of the engine when a predetermined engine operation stop condition is satisfied; and automatically start the operation of the engine when a predetermined engine operation restart condition is satisfied.

In addition, the engine control part is programmed to judge if a malfunction occurs in the suspension control device.

The engine control part is programmed to continue the operation of the engine when a stop inhibition requesting signal for inhibiting the automatic stop of the operation of the engine is sent to the engine control device in order to perform the initializing process and the engine control part judges that no malfunction occurs in the suspension control device even if the engine operation stop condition is satisfied.

On the other hand, the engine control part is programmed to ignore the stop inhibition requesting signal and automatically stop the operation of the engine when the engine operation stop condition is satisfied and the engine control part judges that the malfunction occurs in the suspension control device even if the stop inhibition requesting signal is sent to the engine control device.

Accordingly, the invention device continues to operate the engine when the suspension control device sends the stop inhibition requesting signal to the invention device and thus, the power source voltage does not excessively fall even when the actuator described above is driven. Thereby, the initializing process described above can be assuredly performed. However, when the malfunction occurs in the suspension control device and thus, the suspension control device continues to send the stop inhibition requesting signal to the invention device, the invention device ignores (masks) the stop inhibition requesting signal and thus, the invention device can automatically stop the operation of the engine. As a result, the situation where the vehicle continues to run with an increased consumption of fuel of the engine can be avoided and thus, the increasing of the consumption of fuel can be prevented.

In this case, preferably, the engine control part may be programmed to judge if a malfunction occurs in the suspension control device by using the stop inhibition requesting signal.

Thereby, the invention device can judge if the malfunction occurs in the suspension control device without carrying out an exchange of a specific signal other than the stop inhibition requesting signal between the suspension control device and the invention device (the engine control device).

Further, the suspension control device does not need to always perform the above-mentioned initializing process. Therefore, the suspension control device may be configured to send the stop inhibition requesting signal to the engine control device during a particular time period (that is, during a time period when the stop inhibition requesting signal is needed to be sent to the engine control device in order to perform the initializing process. In this case, as long as the suspension control device is under a normal state, the suspension control device does not send the stop inhibition requesting signal to the engine control device during a time period other than the particular time period.

Accordingly, the engine control part may be programmed to judge that a malfunction occurs in the suspension control device when the suspension control device sends the stop inhibition requesting signal to the engine control part during a time period other than the particular time period. Thereby, the engine control part can easily judge if a malfunction occurs in the suspension control device.

The suspension control device may be configured to perform the above-mentioned initializing process when the vehicle speed becomes a first threshold speed or less after the running state of the vehicle satisfies a predetermined running condition. In this case, the above-mentioned initialization performing condition is satisfied when the vehicle speed becomes the first threshold speed or less after the running state of the vehicle satisfies the predetermined running condition. This first threshold speed is a predetermined extremely low vehicle speed, and can be determined as a vehicle speed suitable for performing the initializing process. Since the above-mentioned initializing process is desirably performed while the vehicle is stopping, the first threshold speed is typically 0 (zero) km/h.

In this case, the suspension control device may be configured to start sending the stop inhibition requesting signal when the running state satisfies the running condition, and to finish sending the stop inhibition requesting signal when the initializing process is completed to be performed. In this case, the suspension control device is configured to start sending the stop inhibition requesting signal before the initialization performing condition is satisfied and the initializing process is started. Thereby, the operation of the engine can be prevented from being automatically stopped to make it difficult to assuredly perform the initializing process when the initialization performing condition is satisfied. Thereafter, the suspension control device finishes sending the stop inhibition requesting signal when the initializing process is completed to be performed.

As described above, the suspension control device starts sending the stop inhibition requesting signal when the predetermined running condition is satisfied before the initialization performing condition is satisfied, and finishes sending the stop inhibition requesting signal when the initializing process is completed to be performed. The timing when the predetermined running condition is satisfied changes depending on the running pattern of the vehicle. Accordingly, the timing when the suspension control device starts sending the stop inhibition requesting signal also changes depending on the running pattern of the vehicle. On the other hand, the timing when the suspension control device finishes sending the stop inhibition requesting signal is the timing when the initializing process is completed to be performed. In addition, the suspension control device starts the initializing process when the initialization performing condition is satisfied, namely when the vehicle speed becomes the first threshold speed or less after the running state of the vehicle satisfies the predetermined running condition.

As will be mentioned later in detail, the initializing process is performed by driving a stepping motor for increasing and/or decreasing the opening degree of a damping force control valve of a shock absorber to change a damping force of the shock absorber in accordance with a predetermined pattern. Therefore, the length of the time period from the start to completion of the initializing process is approximately constant. Namely, the length of the duration of a situation where the initializing process is being performed and the stop inhibition requesting signal is being sent is also approximately constant. On the other hand, during the period when the initializing process is being performed as described above, the vehicle speed is the first threshold speed or less. Therefore, the length of the duration of a situation where the vehicle speed is the first threshold speed or less and the stop inhibition requesting signal is being sent is also approximately constant.

In this case, the engine control part is configured to judge that a malfunction occurs in the suspension control device when a situation where the vehicle speed is the first threshold speed or less and the stop inhibition requesting signal is being sent continues for a first predetermined time period or more. This first predetermined time period is determined corresponding to the time period from the start to completion of the initializing process. Specifically, the first predetermined time period is determined so as to be a time period which is the same as the longest time period from the start to completion of the initializing process or a time period which is somewhat longer than the same. Therefore, when the suspension control device is under a normal state, the suspension control device should complete the performance of the initializing process and finish sending the stop inhibit requesting signal before the first predetermined time period has passed since the start of the initializing process. Namely, when the suspension control device is under a normal state, the situation where the vehicle speed is the first threshold speed or less and the stop inhibition requesting signal is being sent cannot continue for the first predetermined time period or more.

Therefore, the engine control device can easily and assuredly judge if a malfunction occurs in the suspension control device, based on whether the situation where the vehicle speed is the first threshold speed or less and the stop inhibition requesting signal is being sent continues for the first predetermined time period or more.

By the way, the engine control part may be configured to be able to detect the timing when the initialization performing condition is satisfied, for example, via an onboard network (CAN: Controller Area Network). In this case, the engine control part is configured to judge that malfunction occurs in the suspension control device when a situation where the stop inhibition requesting signal is being sent continues until after a time period longer than or equal to the first predetermined time period has passed since the initialization performing condition is satisfied.

Thereby, when the suspension control device is under a normal state, the suspension control device never continues to send the stop inhibition requesting signal until after the first predetermined time period or more has passed since the initialization performing condition is satisfied. Thus, the engine control device can easily and assuredly judge if a malfunction occurs in the suspension control device.

By the way, the above-mentioned predetermined running condition can be determined, for example, as a running condition under which a step-out of the stepping motor is highly likely to occur. In this case, the predetermined running condition can be a condition which is satisfied when the vehicle has continued to run at a second threshold speed higher than the first threshold speed or higher for a time period longer than or equal to a second predetermined time period. This second threshold speed is a vehicle speed which is a predetermined medium vehicle speed or higher. Typically, for example, the second threshold speed is 30 km/h and the second predetermined time period is 30 minutes.

Thereby, the initializing process for the stepping motor can be performed when the vehicle slows down to a speed suitable for performing the initializing process after the vehicle has run under the running condition under which a step-out of the stepping motor is highly likely to occur.

The engine control part of the invention device may be programmed to continue to ignore the stop inhibition requesting signal until a state of an ignition switch of the vehicle is changed from an ON state to an OFF state after the engine control part judges that the malfunction occurs in the suspension control device.

Thereby, when an ignition switch is under an ON state and it is judged that a malfunction occurs in the suspension control device, the stop inhibition requesting signal is continued to be ignored until the state of the ignition switch is changed to an OFF state. Thus, the occasion of automatically stopping the operation of the engine increases. More particularly, once it is judged that a malfunction occurs in the suspension control device when the ignition switch is under the ON state, it can be expected that the suspension control device is continued to be under a malfunction state at least until the driving of the vehicle is terminated. Therefore, according to the invention device having the configuration described above, the occasions of automatically stopping the operation of the engine can be effectively utilized. Alternatively, the automatic stop of the operation of the engine can be carried out without judging if the predetermined time period elapses in order to judge if a malfunction occurs in the suspension control device. Thus, the shortening of the time period when the operation of the engine is stopped can be prevented. Thereby, the increasing of the fuel consumption can be prevented.

In this case, the engine control part may be programmed to stop ignoring the stop inhibition requesting signal when the state of the ignition switch of the vehicle is changed from the ON state to the OFF state and then, to the ON state again after the engine control part judges that the malfunction occurs in the suspension control device.

After the state of the ignition switch is changed to the OFF state, the suspension control device may be repaired until the state of the ignition switch is changed to the ON state next time. Therefore, when the state of the ignition switch is again changed to the ON state, it is desired that it is judged if a malfunction occurs in the suspension control device again. Thereby, the user can efficiently use the function of the suspension control device.

The other objects, the other features and the accompanying advantages of the invention can be easily understood from the description of the embodiments of the invention with reference to the drawings.

DESCRIPTION OF THE EMBODIMENTS

<Configuration>

Figure 1:
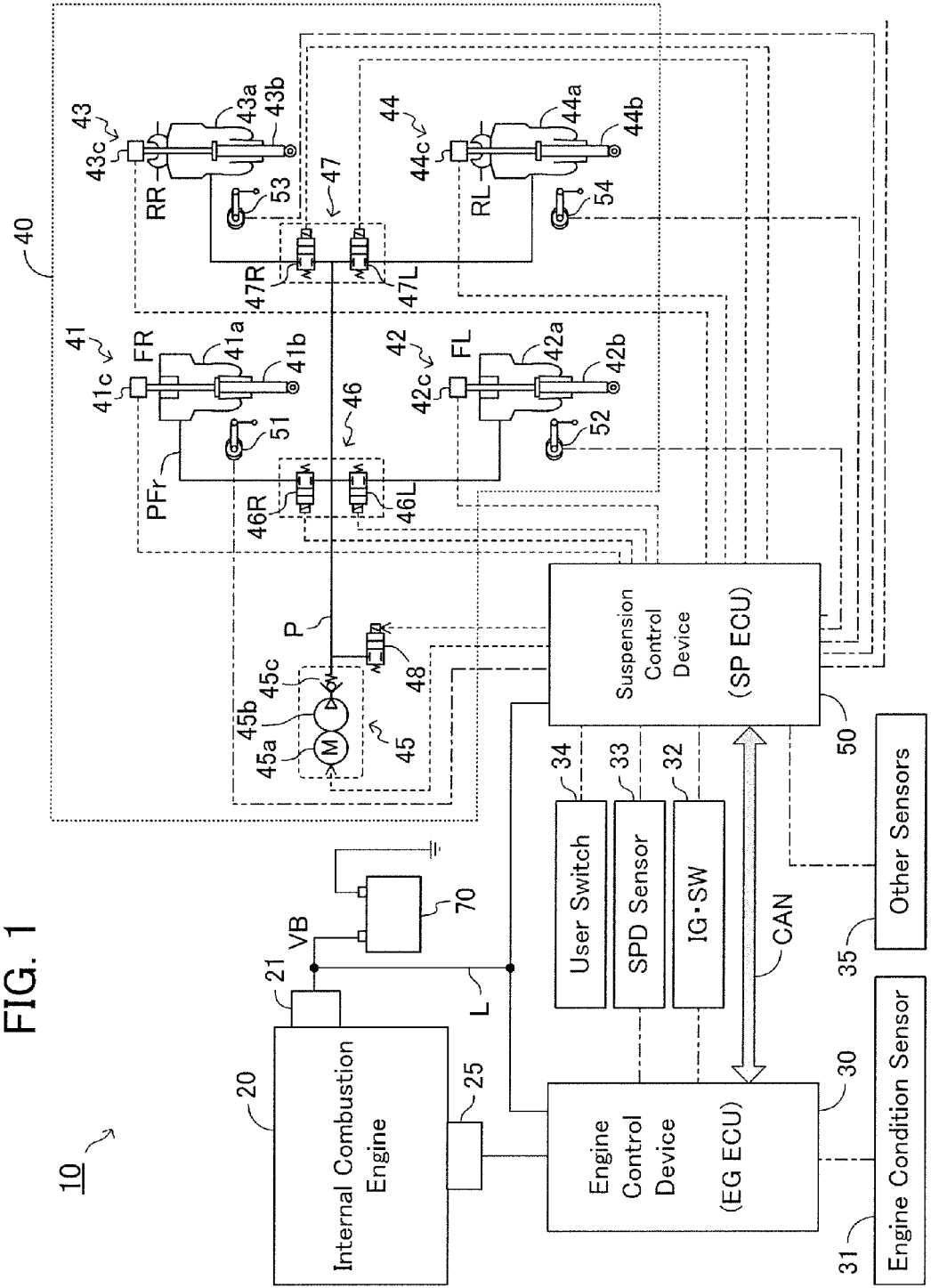
FIG. 1 is a schematic configuration diagram of a vehicle equipped with an engine control device according to the embodiment of the invention.

FIG. 1 shows a general configuration of a vehicle 10 equipped with an engine control device according to an embodiment of the invention. The vehicle 10 is equipped with an internal combustion engine 20, engine actuators 25, an engine control device 30, a suspension device 40, a suspension control device 50, etc.

The engine 20 is a four-cycle spark-ignition multi-cylinder gasoline-fuel internal combustion engine. The engine 20 is configured to generate a torque for driving drive wheels (not shown) of the vehicle 10. Further, the engine 20 is configured to drive an alternator (an electric generator) 21 during the engine operation and generate an electric power by the alternator 21. The engine actuators 25 include actuators for carrying out operations necessary to operate the engine 20. For example, the engine actuators include fuel injectors, ignition devices and a throttle actuator for changing an opening degree of a throttle valve.

The engine control device 30 includes an electronic control circuit having the well-known micro computer including the CPU, the ROM, the RAM, the backup RAM, the interface provided with the AD converter, etc. The ROM stores programs (instructions) executed by the CPU. Hereinafter, the engine control device 30 will be referred to as "the engine ECU" and may be written by "the EG/ECU". The ECU means the Electronic Control Unit. Further, the engine control device 30 may be referred to as "the automatic stop/start control device of the engine (S&S/ECU: Start and Stop ECU)".

The engine control device 30 is configured to acquire various input values from a plurality of engine operation state amount sensors 31 and ignition switch 32.

The engine operation state amount sensors 31 include sensors and a switch described below.

An engine speed sensor for detecting the engine speed NE.

A throttle valve opening degree sensor for detecting an opening degree TA of the throttle valve not shown.

An acceleration pedal manipulation amount sensor for detecting a manipulation amount AP of the acceleration pedal not shown.

An air flow meter for detecting an intake air amount Ga of the engine.

A brake switch (a stop lamp switch) for detecting a depression of the brake pedal not shown.

The engine control device 30 is connected to the suspension control device 50 via an onboard network (CAN) so as to enable an information exchange (a communication) with the suspension control device 50. Further, the engine control device 30 is connected to the engine actuators 25 and is configured to send driving signals to the engine actuators 25, respectively. That is, the engine control device 30 is configured to send ignition command signals to the ignition plugs (actually, the igniters) of the cylinders, respectively, send injection command signals to the fuel injectors of the cylinders, respectively, and send an opening degree command signal to the throttle actuator.

The suspension device 40 is the well-known air suspension device having a damping force variable function and includes devices, parts, etc. described below.

A right front side suspension device 41.
A left front side suspension device 42.
A right rear side suspension device 43.
A left rear side suspension device 44.
A compressor/motor device 45.
A front vehicle height adjustment valve device 46.
A rear vehicle height adjustment valve device 47.
An exhaust valve 48.

The right front side suspension device 41 has a chamber 41a including a diaphragm, a shock absorber 41b and an absorber control actuator 41c. Hereinafter, the absorber control actuator 41c may be written by "the ACA".

When a compressed air is supplied to the chamber 41a via an air delivery pipes P and PFr, the distance between the right front wheel and the vehicle body is increased and thus, the vehicle height of the vehicle body part at the right front wheel area is raised. When the air is discharged from the chamber 41a, the distance between the right front wheel and the corresponding vehicle body is decreased and thus, the vehicle height of the vehicle body part at the right front wheel area is lowered.

The shock absorber 41b includes a rotary valve (not shown) for changing the damping force with multistep (in this embodiment, sixteen steps).

The ACA 41c is a step motor and rotates the rotary valve to increase and/or decrease its opening degree and thereby changes the damping force generated by the shock absorber 41b. Hereinafter, the rotary valve may be referred to as a "damping force control valve."

The left front side, right rear side and left rear side suspension devices 42, 43 and 44 have the same configuration as the configuration of the right front side suspension device 41, respectively and thus, the descriptions thereof will be omitted. It should be noted that the elements 42a, 43a and 44a are chambers corresponding to the chamber 41a, respectively. Further, the elements 42b, 43b and 44b are shock absorbers corresponding to the shock absorber 41b, respectively. Furthermore, the elements 42c, 43c and 44c are ACAs (stepping motors) corresponding to the ACA 41c, respectively.

The compressor/motor device 45 includes a motor (an electric motor) 45a, a compressor 45b and a check valve 45c.

The motor 45a is one of the electrically driven actuators for changing a suspension property (the vehicle height) of the vehicle body according to the invention. The motor 45a drives the compressor 45b. The motor 45a is controlled by the suspension control device 50.

When the compressor 45b is driven, the compressor 45b compresses the air and supplies the compressed air to the air delivery pipe P.

The check valve 45c allows the air to flow from the compressor 45b to the air delivery pipe P and prevents the air from flowing from the air delivery pipe P to the compressor 45b.

The front vehicle height adjustment valve device 46 has a right front side and left front side control valves 46R and 46L.

The right front side control valve 46R is a two position electromagnetic valve which can be positioned selectively at one of communication and shut-off positions. When the right front side control valve 46R is positioned at the communication position, the air delivery pipe P and the air delivery pipe PFr communicate with each other. Therefore, the air delivery pipe P and the chamber 41a communicate with each other. On the other hand, when the right front side control valve 46R is positioned at the shut-off position, the communication of the air delivery pipes P and PFr with each other is shut off. Therefore, the communication of the delivery pipe P and the chamber 41a with each other is shut off. The right front side control valve 46R is controlled by the suspension control device 50.

The left front side control valve 46L has the same configuration and function as the configuration and the function of the right front side control valve 46R. Therefore, when the left front side control valve 46L is positioned at the communication position, the air delivery pipe P and the chamber 42a communicate with each other. On the other hand, when the left front side control valve 46L is positioned at the shut-off position, the communication of the air delivery pipe P and the chamber 42a with each other is shut off. The left front side control valve 46L is controlled by the suspension control device 50.

The rear vehicle height adjustment device 47 has a right rear side and left rear side control valves 47R and 47L.

The right rear side control valve 47R has the same configuration and function as the configuration and function of the right front side control valve 46R. Therefore, when the right rear side control valve 47R is positioned at the communication position, the air delivery pipe P and the chamber 43a communicate with each other. On the other hand, when the right rear side control valve 47R is positioned at the shut-off position, the communication of the air delivery pipe P and the chamber 43a with each other is shut off. The right rear side control valve 47R is controlled by the suspension control device 50.

The left rear side control valve 47L has the same configuration and function as the configuration and function of the right rear side control valve 47R. Therefore, when the left rear side control valve 47L is positioned at the communication position, the air delivery pipe P and the chamber 44a communicate with each other. On the other hand, when the rear left control valve 47L is positioned at the shut-off position, the communication of the air delivery pipe P and the chamber 44a with each other is shut off. The left rear side control valve 47L is controlled by the suspension control device 50.

The exhaust valve 48 is a two position electromagnetic valve which can be positioned selectively at one of communication and shut-off positions. When the exhaust valve 48 is positioned at the communication position, the air delivery pipe P opens to the outside air. On the other hand, when the exhaust valve 48 is positioned at the shut-off position, the air delivery pipe P does not open to the outside air. The exhaust valve 48 is controlled by the suspension control device 50.

The suspension control device 50 includes an electronic control circuit including the micro computer similar to the micro computer of the engine control device 30. Hereinafter, the suspension control device 50 may be referred to as "the vehicle height adjustment control device" or "the suspension ECU" or "the absorber control unit" and may be written by "the SP/ECU".

The suspension control device 50 is configured to receive signals from the ignition switch 32, the vehicle speed sensor 33 for detecting the vehicle speed SPD and a user switch (a change-over switch) 34.

The user switch 34 is a switch manipulated by a user when the user selects the vehicle height and/or the damping force which the user desires. The user can select and instruct any of the vehicle height raising and lowering by manipulating the user switch 34. Further, the user can select and instruct the damping forces of the shock absorbers 41b to 44b corresponding to the wheels, respectively at any of the hard, normal and soft modes by manipulating the user switch 34.

Furthermore, the suspension control device 50 is configured to acquire input values from a plurality of sensors for detecting suspension state amounts described below, respectively.

A vehicle height sensor 51 for detecting the vehicle height and the vertical direction acceleration of the right front wheel area vehicle body part (at the front right side).

A vehicle height sensor 52 for detecting the vehicle height and the vertical direction acceleration of the left front wheel area vehicle body part (at the front left side).

A vehicle height sensor 53 for detecting the vehicle height and the vertical direction acceleration of the right rear wheel area vehicle body part (at the rear right side).

A vehicle height sensor 54 for detecting the vehicle height and the vertical direction acceleration of the left rear wheel area vehicle body part (at the rear left side).

That is, each of the vehicle height sensors 51 to 54 incorporates a G sensor for detecting the acceleration in the vertical direction of a predetermined part of the vehicle body.

In addition, the suspension control device 50 is connected to the other sensors 35 and is configured to acquire various input values from the sensors 35. The sensors 35 include a yaw rate sensor, a steering angle sensor, etc.

The suspension control device 50 is connected to the electric actuators of the suspension device 40 (that is, the ACAs 41c to 44c, the control valves 46R, 46L, 47R and 47L, the compressor driving motor 45a, and the exhaust valve 48, etc.). The suspension control device 50 is configured to send the driving signals to the actuators.

For example, the suspension control device 50 drives the motor 45a and moves the right front side control valve 46R to the communication position while moving the exhaust valve 48 to the shut-off position in order to raise the vehicle height on the right front side. Thereby, the air compressed by the motor 45a and the compressor 45b is supplied to the chamber 41a through the air delivery pipe P, the right front side control valve 46R and the air delivery pipe PFr. As a result, the vehicle height on the right front side is raised. Then, the suspension control device 50 moves the right front side control valve 46R to the shut-off position. As a result, the vehicle height on the right front side is maintained.

On the other hand, the suspension control device 50 stops the operation of the motor 45a and moves the right front side control valve 46R to the communication position while moving the exhaust valve 48 to the communication position in order to lower the vehicle height on the right front side. Thereby, the air in the chamber 41a is discharged to the outside air through the air delivery pipe PFr, the right front side control valve 46R, the air delivery pipe P and the exhaust valve 48. As a result, the vehicle height on the right front side is lowered. Then, the suspension control device 50 moves the right front side control valve 46R to the shut-off position. As a result, the vehicle height on the right front side is maintained.

Similarly, the motor 45a, the left front side control valve 46L and the exhaust valve 48 are used to adjust the vehicle height on the left front side. The motor 45a, the right rear side control valve 47R and the exhaust valve 48 are used to adjust the vehicle height on the right rear side. The motor 45a, the left rear side control valve 47L and the exhaust valve 48 are used to adjust the vehicle height on the left rear side. The method for controlling the adjustment of the vehicle height on each of these sides is similar to the method for controlling the adjustment of the vehicle height on the right front side described above and thus, the detailed descriptions thereof will be omitted.

Further, the suspension control device 50 calculates an optimal damping force at each of the wheels on the basis of the received various sensor signals, etc. Then, the suspension control device 50 sends driving signals for changing the step position of each of the absorber control actuators (ACAs) 41c to 44c each of the absorber control actuators (stepping motors) 41c to 44c such that the damping force of each of the shock absorbers 41b to 44b of the wheels corresponds to the calculated optimal damping force. Generally, the stepping motors 41c to 44c are thus driven while the vehicle 10 is running.

However, in the shock absorbers 41b to 44b, for example, due to an impact reached from a road surface while the vehicle is running and/or increased viscosity of oil, etc., the torque required to change the opening degree of the damping force control valve may exceed the driving torque for the stepping motor 41c to 44c. As a result, the shock absorbers may get a situation where the damping forces of the shock absorbers 41b to 44b based on a command value from the suspension control device 50 to the stepping motors 41c to 44c are not consistent with actual damping forces of the shock absorbers 41b to 44b. Such a situation is referred to as a "step-out."

Therefore, the suspension control device 50 performs the initializing process in which the step-out is resolved by driving the stepping motors 41c to 44c when the predetermined initialization performing condition is satisfied. Specifically, the suspension control device 50 sends command values to the stepping motors 41c to 44c such that the step positions of the stepping motors 41c to 44c is raised to their highest step positions from the step positions of the stepping motors 41c to 44c upon the initialization performing condition being satisfied and thereafter lowered to their lowest step positions.

For example, when there are 16 degrees of the damping forces of the shock absorbers 41b to 44b and the step position of the stepping motors 41c to 44c detected by the suspension control device 50 upon the initialization performing condition being satisfied is (the step position corresponding to) the ninth degree, the suspension control device 50 commands the stepping motors 41c to 44c to raise their step positions by 7 degrees (=16 degrees−9 degrees) and thereafter commands them to lower their step positions to their lowest step position (that is, by 16 degrees). Thereby, the step positions of the stepping motors 41c to 44c become consistent with the command value from the suspension control device 50 at their lowest step position. Namely, the step positions of the stepping motors 41c to 44c are initialized. Moreover, contrary to the above, the step positions of the stepping motors 41c to 44c may be lowered and thereafter raised. In this case, the step positions of the stepping motors 41c to 44c become consistent with the command value from the suspension control device 50 at their highest step position (initialized).

Alternatively, the suspension control device 50 may command the stepping motors 41c to 44c to raise their step positions by the number of degrees of the damping forces of the shock absorbers 41b to 44b (16 degrees) and thereafter lower their step positions by the same number of degrees (16 degrees). Also in this case, the step positions of the stepping motors 41c to 44c become consistent with the command value from the suspension control device 50 at their lowest step position. Namely, the step positions of the stepping motors 41c to 44c are initialized. Moreover, contrary to the above, the step positions of the stepping motors 41c to 44c may be lowered and thereafter raised. In this case, the step positions of the stepping motors 41c to 44c become consistent with the command value from the suspension control device 50 at their highest step position (initialized). Further, specific procedures for performing the initializing process are not limited to the above, and various procedures known in the conventional technologies including the above-mentioned prior art documents can be adopted.

Further, the vehicle 10 incorporates a battery 70 for accessories of the vehicle 10. The battery 70 is electrically connected to the alternator 21 (and actually, a voltage regulator) and is configured to be charged by the power generated by the alternator 21. The battery 70 is connected to the engine control device 30 and the suspension control device 50 by power lines L, respectively and functions as a power source for the devices 30 and 50 (supplies the power to the devices 30 and 50).

In the above, a case where the suspension device 40 is an air suspension device using an air spring has been explained. However, the suspension device 40 may be a well-known suspension device having a damping force variable function and using a spring in place of an air spring.

<Summary of Actuation of Engine Control Device>

Next, the summary of the actuation of the engine control device (the EG/ECU) 30 configured as described above will be described. The CPU of the engine control device 30 is programmed to execute a routine shown in FIG. 2 by a summarized flow chart every a predetermined time period elapses. Hereinafter, the CPU of the engine control device 30 will be written by "the EG/CPU".

Therefore, the EG/CPU starts the processes from the step 200 at a predetermined timing and then, proceeds to the step 210 where the EG/CPU judges if the engine 20 is being operated. When the engine 20 is not operated at the process of the step 210 being executed, the EG/CPU judges "No" at the step 210 and then, proceeds directly to the step 295 where the EG/CPU terminates the routine.

On the other hand, when the engine 20 is being operated at the process of the step 210 being executed, the EG/CPU judges "Yes" at the step 210 and then, proceeds to the step 220 where the EG/CPU judges if the engine operation stop condition (the condition for temporarily stopping the operation of the engine 20) is satisfied. For example, the engine operation stop condition is satisfied when all conditions described below are satisfied.

(Condition 1) The vehicle speed SPD is smaller than or equal to a threshold vehicle speed for the engine operation stop SPDth0. The threshold vehicle speed for the engine operation stop SPDth0 is a predetermined low vehicle speed and may be zero (km/h).

(Condition 2) The brake switch is under the ON state. That is, the brake pedal is depressed and the vehicle 10 is braking.

(Condition 3) The acceleration pedal manipulation amount AP is zero. That is, the acceleration pedal is not depressed and thus, no acceleration is requested.

However, the engine operation stop condition is not limited to the conditions described above. For example, the condition that the battery voltage VB is higher than or equal to a predetermined threshold voltage VBth and/or the condition that the cooling water temperature THW is higher than or equal to a predetermined threshold cooling water temperature THWth, etc. may be added to the conditions 1 to 3 described above.

When the engine operation stop condition is not satisfied at the process of the step 220 being executed, the EG/CPU judges "No" at the step 220 and then, proceeds directly to the step 250 where the EG/CPU continues to operate the engine 20. Then, the EG/CPU proceeds to the step 295 where the EG/CPU terminates the routine.

On the other hand, when the engine operation stop condition is satisfied at the process of the step 220 being executed, the EG/CPU judges "Yes" at the step 220 and then, proceeds to the step 230 where the EG/CPU judges if the suspension control device (the SP/ECU) 50 sends a signal for requesting to inhibit the stop of the engine operation (the stop inhibition requesting signal) to the EG/ECU 30.

The SP/ECU 50 is configured to send the stop inhibition requesting signal to the EG/ECU 30 to prevent the battery voltage VB from lowering excessively when the SP/ECU 50 drives the predetermined actuators of the suspension device 40. The predetermined actuators are electric actuators for changing the suspension property, respectively, each of which consumes a large amount of the power or needs a large value of the electric source voltage for ensuring the operation of the actuator. The stepping motors as the absorber control actuators (the ACAs) 41c to 44c correspond to such predetermined actuators.

Namely, the SP/ECU 50 sends the stop inhibition requesting signal to the EG/ECU 30, in order to prevent the battery voltage VB from lowering excessively and assuredly drive the stepping motors (ACAs) 41c to 44c. Further, the SP/ECU 50 is configured to finish sending the stop inhibition requesting signal when the initializing process is completed to be performed.

When the SP/ECU 50 does not send the stop inhibition requesting signal to the EG/ECU 30 at the process of the step 230 being executed, the EG/CPU judges "No" at the step 230 and then, proceeds to the step 260 where the EG/CPU stops the operation of the engine 20, for example, by stopping the fuel injections. Then, the EG/CPU proceeds to the step 295 where the EG/CPU terminates the routine.

On the other hand, when the SP/ECU 50 sends the stop inhibition requesting signal to the EG/ECU 30 at the process of the step 230 being executed, the EG/CPU judges "Yes" at the step 230 and then, proceeds to the step 240 where the EG/CPU judges if a malfunction occurs in the SP/ECU 50.

As described above, as long as the SP/ECU 50 is under a normal state, the SP/ECU 50 is configured not to continue to send the stop inhibition requesting signal to the EG/ECU 30 after the initializing process is completed to be performed. The initializing process is a process to drive a stepping motor in accordance with a predetermined pattern to resolve its step-out. The length of the time period required for performing the initializing process is approximately constant at an extremely short time period (for example, a few seconds). Therefore, the SP/ECU 50 never send the stop inhibition requesting signal continuously for a predetermined time period (first predetermined time period) after the initialization performing condition is satisfied (the initializing process is started), as long as the SP/ECU 50 is under a normal state.

Accordingly, the EG/CPU 30 judges if a malfunction occurs in the SP/ECU 50 by judging if the SP/ECU 50 has continued to send the stop inhibition requesting signal to the EG/ECU 30 beyond the first predetermined time period after the initialization performing condition is satisfied. Specific length of the first predetermined time period can be properly determined, for example, in accordance with the maximum value of the time period required for performing the initializing process, etc. However, the method for judging if a malfunction occurs in the SP/ECU 50 at the step 240 is not limited to the method described above.

When the EG/CPU 30 judges that no malfunction occurs in the SP/ECU 50, the EG/CPU 30 proceeds from the step 240 to the step 250. That is, when the EG/CPU 30 judges that no malfunction occurs in the SP/ECU 50 (in other words, the EG/CPU 30 judges that the SP/ECU 50 is under a normal state), the EG/CPU 30 proceeds to the step 250 where the EG/CPU continues to operate the engine 20 and then, proceeds to the step 295.

On the other hand, when the SP/ECU 50 has continued to send the stop inhibition requesting signal continuously for the first predetermined time period after the initialization performing condition is satisfied and thus the EG/CPU 30 judges that a malfunction occurs in the SP/ECU 50, the EG/CPU proceeds from the step 240 to the step 260 where the EG/CPU 30 stops the operation of the engine 20. Namely, even when the SP/ECU 50 generates the stop inhibition requesting signal, the EG/ECU 30 deems that the stop inhibition requesting signal is generated (sent) due to a malfunction of the SP/ECU 50 and then the EG/ECU 30 stops the operation of the engine 20 while ignoring (masking) the stop inhibition requesting signal. Then, the EG/CPU 30 proceeds to the step 295 where the EG/CPU 30 terminates the routine. The summary of the actuation of the engine control device 30 relating to the invention was described.

<Actual Actuation>

Next, the concrete actuations of the engine control unit (the EG/ECU) 30 and the suspension control device (the SP/ECU) 50 will be described.

1. Actuation of SP/ECU (1) Initializing Process

Figure 3:
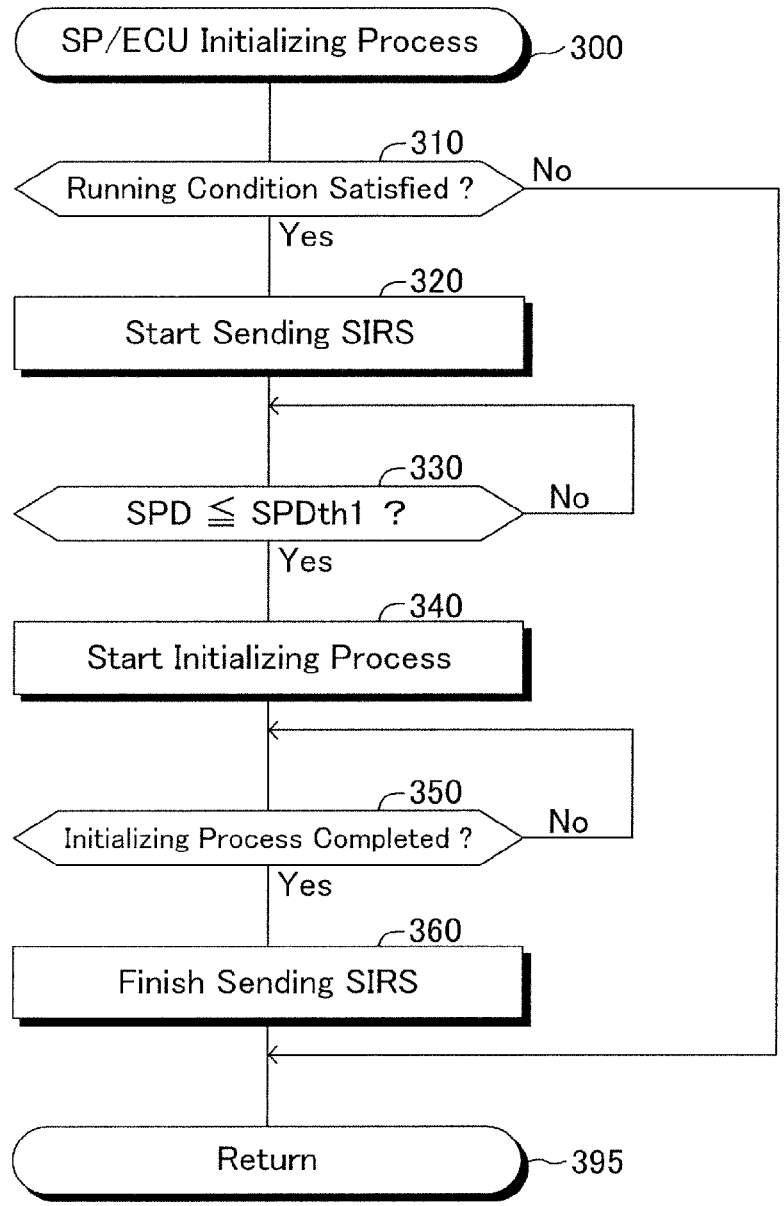
FIG. 3 is a flow chart showing a vehicle height control routine executed by a CPU of a suspension control device shown in FIG. 1.

The CPU of the SP/ECU 50 is programmed to execute an initializing process routine shown in FIG. 3 by a flow chart every a predetermined time period elapses. Hereinafter, the CPU of the SP/ECU 50 will be written as the "SP/CPU". Therefore, the SP/CPU starts the processes from the step 300 of FIG. 3 at a predetermined timing and then proceeds to the step 310 where the SP/CPU judges if a predetermined running condition is satisfied at the present moment. The "predetermined running condition" is a running condition under which a step-out of the stepping motor 41c to 4c is highly likely to occur. Typically, the predetermined running condition can be defined as a condition which is satisfied when the vehicle 10 has continued to run at the second threshold speed SPDth2 (for example, 30 km/h) higher than the first threshold speed or higher for a time period longer than or equal to the second predetermined time period Tth2 (for example, 30 minutes), as mentioned above.

The above will be explained referring to a drawing showing a running condition of the vehicle 10. In the graph shown in FIG. 4, the speed of the vehicle 10 (vehicle speed SPD) starts increasing at the time t0 and reaches the second predetermined time period Tth2 at the time t1. Thereafter, a situation where the vehicle speed is the second threshold speed SPDth2 or more continues, the duration of this situation becomes the second predetermined time period Tth2 at the time t2, and thereafter it continues up to at the time t3. Namely, in this case, the "predetermined running condition" is satisfied at the time t2.

Figure 4:
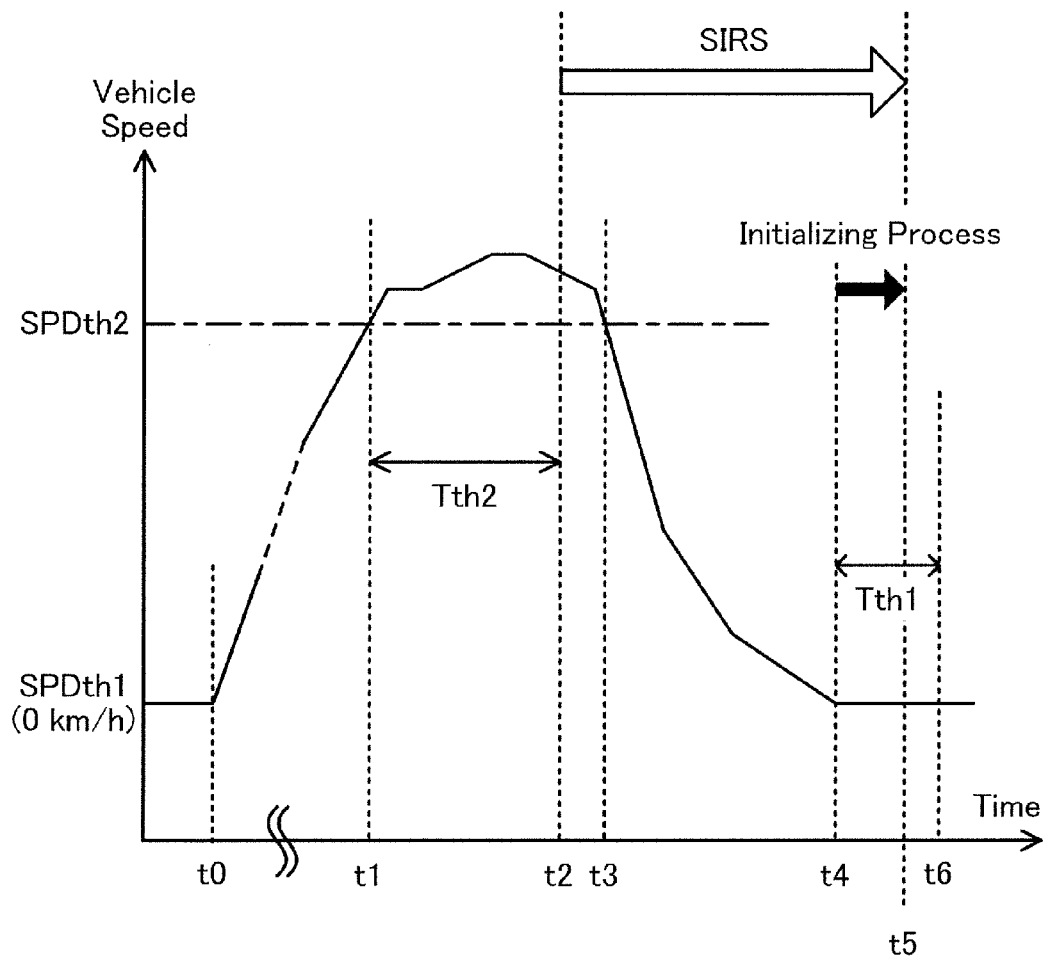
FIG. 4 is a graph showing a relation between running patterns of the vehicle shown in FIG. 1 and the first and second threshold speeds and the first and second predetermined time periods.

Before the time t2 in FIG. 4, the predetermined running condition is not satisfied. In this case, the SP/CPU judges "No" at the step 310 and proceeds directly to the step 395 where the SP/CPU terminates the routine.

On the other hand, at and after the time t2 in FIG. 4, the predetermined running condition is satisfied. In this case, the SP/CPU judges "Yes" at the step 310 and proceeds to the step 320 where the SP/CPU starts sending the stop inhibition requesting signal (request to inhibit the stop of the operation of the engine 20) to the EG/ECU 30 (refer to the outlined white bold arrow in FIG. 4). The SP/CPU sends the stop inhibition requesting signal to the EG/ECU 30 via an onboard network (CAN).

Next, the SP/CPU proceeds to the step 330 where the SP/CPU judges if the vehicle speed is the first threshold speed SPDth1 or less. In FIG. 4, the vehicle speed SPD falls below the second threshold speed SPDth2 at and after the time t3, and the vehicle speed SPD is the first threshold speed SPDth1 at the time t4. Namely, the "initialization performing condition" is satisfied at the time t4.

Before the time t4 in FIG. 4, the speed SPD of the vehicle 10 is not the first threshold speed SPDth1 or less. Namely, the "initialization performing condition" is not satisfied. In this case, the SP/CPU judges "No" at the step 330, and waits till the speed SPD of the vehicle 10 becomes the first threshold speed SPDth1 or less.

On the other hand, at and after the time t4, the speed SPD of the vehicle 10 is the first threshold speed SPDth1 or less. Namely, the "initialization performing condition" is satisfied. In this case, the SP/CPU judges "Yes" at the step 330 and proceeds to the step 340 where the SP/CPU starts performing the initializing process for the stepping motors 41c to 44c (refer to the black bold arrow in FIG. 4).

Next, the SP/CPU proceeds to the step 350 where the SP/CPU judges if the initializing process is completed to be performed. In FIG. 4, the initializing process is completed to be performed at the time t5. Accordingly, before the time t5, the initializing process is not completed to be performed. Namely, the SP/CPU judges "No" at the step 350, and waits till the initializing process is completed to be performed.

On the other hand, when the initializing process is completed to be performed, the SP/CPU judges "Yes" at the step 350 and proceeds to the step 360 where the SP/CPU finishes sending the stop inhibition requesting signal, and proceeds to the step 395 where the SP/CPU terminates the routine.

2. Actuation of EG/ECU
(1) Resetting of Mask (Mask Flag)

Figure 5:
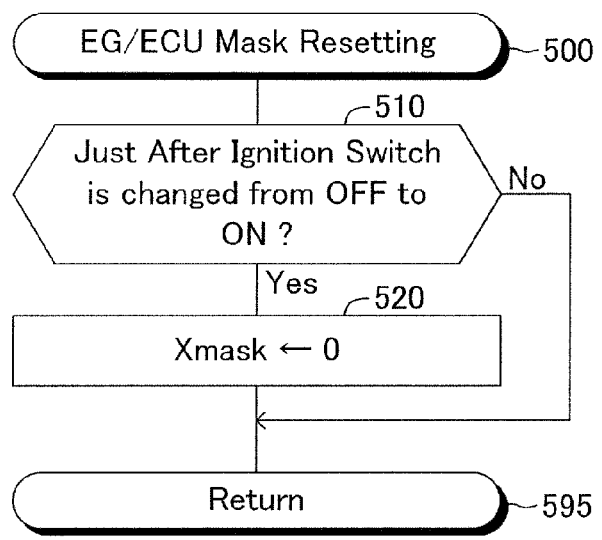
FIG. 5 is a flow chart showing a mask resetting routine executed by a CPU of the engine control device shown in FIG. 1.

The CPU of the EG/ECU 30 (the EG/CPU) is programmed to execute a mask resetting routine shown in FIG. 5 by a flow chart every a predetermined time period elapses. Therefore, the EG/CPU starts the processes from the step 500 of FIG. 5 at a predetermined timing and then, proceeds to the step 510 where the EG/CPU judges if the present time is immediately after the state of the ignition switch 32 is changed from the OFF position (the OFF state) to the ON position (the ON state).

When the present time is immediately after the ignition switch 32 is changed to the ON position, the EG/CPU judges "Yes" at the step 510 and then, proceeds to the step 520 where the EG/CPU sets "0" to the value of a mask flag Xmask (resets the mask flag Xmask). Then, the EG/CPU proceeds to the step 595 where the EG/CPU terminates the routine.

On the other hand, when the present time is not immediately after the ignition switch 32 is changed to the ON position at the process of the step 510 being executed, the EG/CPU judges "No" at the step 510 and then, proceeds directly to the step 595 where the EG/CPU terminates the routine. As described above, the mask flag Xmask is reset immediately after the state of the ignition switch 32 is changed from the OFF state to the ON state.

(2) Setting of Mask (Mask Flag)

Figure 6:
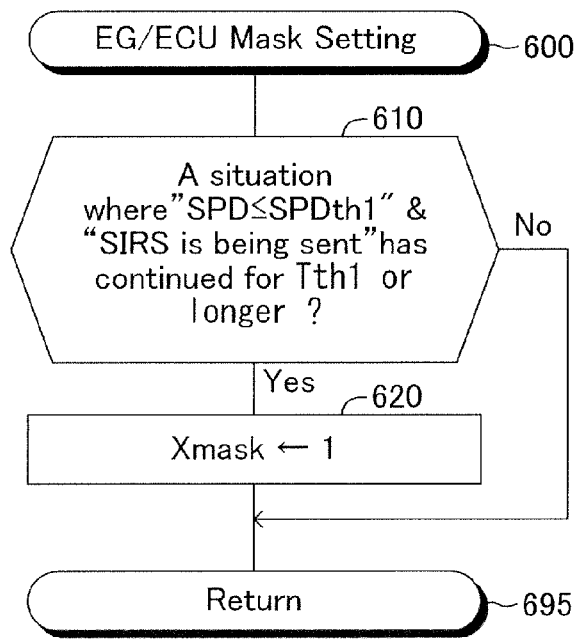
FIG. 6 is a flow chart showing a mask setting routine executed by the CPU of the engine control device shown in FIG. 1.

The EG/CPU is programmed to execute a mask setting routine shown in FIG. 6 by a flow chart every a predetermined time period elapses. Therefore, the EG/CPU starts the processes from the step 600 of FIG. 6 at a predetermined timing and then, proceeds to the step 610 where the EG/CPU judges if a situation where "the speed SPD of the vehicle 10 is the first threshold speed SPDth1 or less" and "the stop inhibition requesting signal is being sent" (a situation where "there is the stop inhibition requesting signal") continues for the first predetermined time period (Tth1 in FIG. 4) or more.

As described above, the first predetermined time period Tth1 is determined so as to be a time period which is the same as the longest time period from the start to completion of the initializing process or a time period which is somewhat longer than the same. Therefore, when the first threshold time period Tth1 or more has passed since the initialization performing condition is satisfied (the time t4), the initializing process is sufficiently completed to be performed. On the other hand, during the time period from the start of the initializing process (satisfaction of the initialization performing condition) to the completion of the initializing process, the speed SPD of the vehicle 10 is the first threshold speed SPDth1 or less. Therefore, if the SP/ECU 50 is under a normal state, the situation where the speed SPD of the vehicle 10 is the first threshold speed SPDth1 or less and the stop inhibition requesting signal is being sent never continues for the first predetermined time period Tth1 or more. Namely, the stop inhibition requesting signal is never sent continuously from the time t4 to the time t6 or later. Therefore, when the speed SPD of the vehicle 10 is the first threshold speed SPDth1 or less and the SP/ECU 50 has continued to send the stop inhibition requesting signal to the EG/ECU 30 beyond the first threshold time period Tth1, it can be judged that a malfunction occurs in the SP/ECU 50. One of the reasons of generating such a malfunction is the thermal runaway of the SP/CPU.

Accordingly, when the speed SPD of the vehicle 10 is the first threshold speed SPDth1 or less and the SP/ECU 50 has continued to send the stop inhibition requesting signal to the EG/ECU 30 beyond the first threshold time period Tth1, the EG/CPU judges that the malfunction occurs in the SP/ECU 50 (that is, the EG/CPU judges "Yes" at the step 610) and then, proceeds to the step 620. At the step 620, the EG/CPU sets "1" to the value of the mask flag Xmask (that is, the EG/CPU sets the mask flag Xmask) and then, proceeds to the step 695 where the EG/CPU terminates the routine.

On the other hand, when the SP/ECU 50 has not continued to send the stop inhibition requesting signal to the EG/ECU 30 beyond the first threshold time period Tth1 from the time when the initialization performing condition is satisfied (the time t4), the EG/CPU judges "No" at the step 610 and then, proceeds directly to the step 695 where the EG/CPU terminates the routine.

(3) Automatic Stop of Engine Operation

Figure 7:
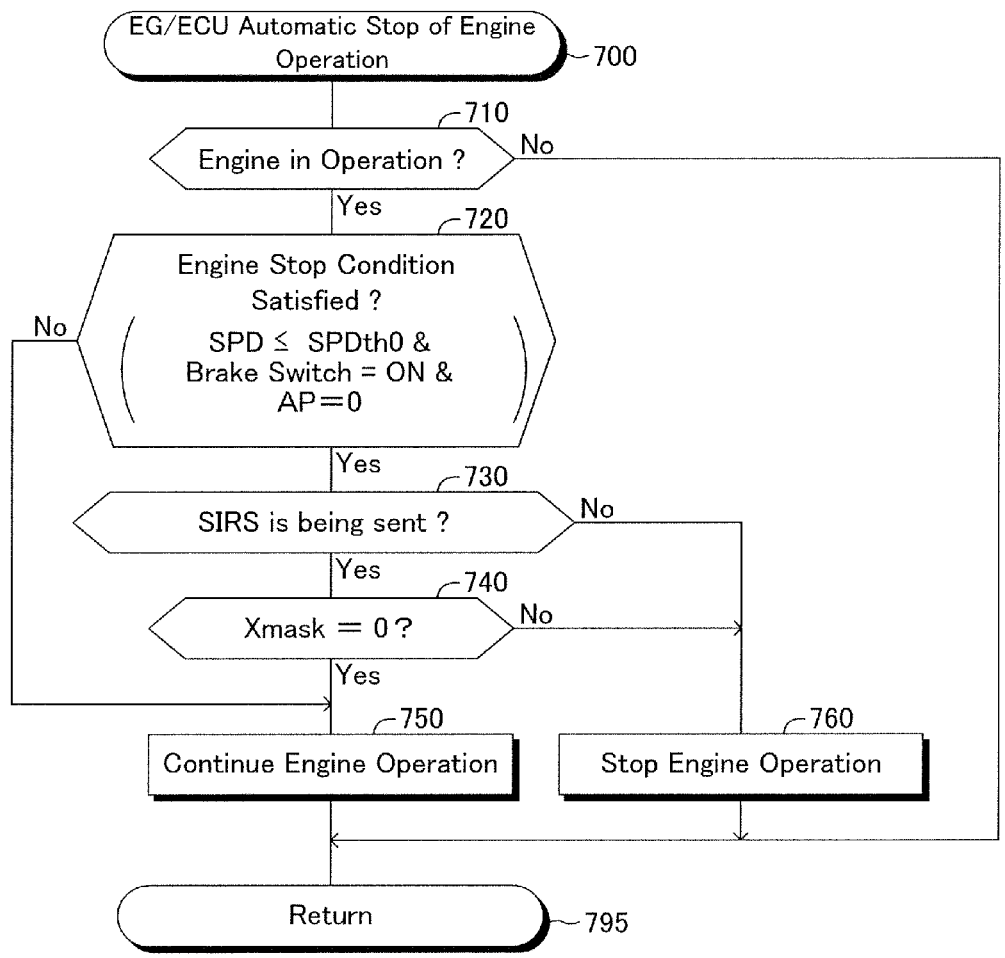
FIG. 7 is a flow chart showing an automatic engine operation stopping routine executed by the CPU of the engine control device shown in FIG. 1.

The EG/CPU is programmed to execute an automatic engine operation stopping routine shown in FIG. 7 by a flow chart every a predetermined time period elapses. Therefore, the EG/CPU starts the processes from the step 700 of FIG. 7 at a predetermined timing and then, proceeds to the step 710 where the EG/CPU judges if the engine 20 is being operated. When the operation of the engine 20 is stopped, the EG/CPU judges "No" at the step 710 and then, proceeds directly to the step 795 where the EG/CPU terminates the routine.

On the other hand, when the engine 20 is being operated at the process of the step 710 being executed, the EG/CPU judges "Yes" at the step 710 and then, proceeds to the step 720 where the EG/CPU judges if the engine operation stop condition described above is satisfied (refer to the conditions 1 to 3 described above).

When the engine operation stop condition is not satisfied, the EG/CPU judges "No" at the step 720 and then, proceeds directly to the step 750 where the EG/CPU continues to operate the engine 20. Then, the EG/CPU proceeds to the step 795 where the EG/CPU terminates the routine.

On the other hand, when the engine operation stop condition is satisfied at the process of the step 720 being executed, the EG/CPU judges "Yes" at the step 720 and then, proceeds to the step 730 where the EG/CPU judges if the SP/ECU 50 sends the stop inhibition requesting signal to the EG/ECU 30.

When the SP/ECU 50 does not send the stop inhibition requesting signal to the EG/ECU 30, the EG/CPU judges "No" at the step 730 and then, proceeds to the step 760 where the EG/CPU stops the operation of the engine 20 by stopping the fuel injection and the fuel ignition. Then, the EG/CPU proceeds to the step 795 where the EG/CPU terminates the routine.

On the other hand, when the SP/ECU 50 sends the stop inhibition requesting signal to the EG/ECU 30 at the process of the step 730 being executed, the EG/CPU judges "Yes" at the step 730 and then, proceeds to the step 740 where the EG/CPU judges if the value of the mask flag Xmask is "0". That is, the EG/CPU judges if it is judged that the malfunction occurs in the SP/ECU 50 on the basis of the value of the mask flag Xmask.

When the value of the mask flag Xmask is "0", that is, when the EG/CPU does not judge that the malfunction occurs in the SP/ECU 50, the EG/CPU judges "Yes" at the step 740 and then, proceeds to the step 750. At the step 750, the EG/CPU continues to operate the engine 20 without automatically stopping the operation of the engine 20 and then, proceeds to the step 795 where the EG/CPU terminates the routine.

On the other hand, when the value of the mask flag Xmask is "1" at the process of the step 740 being executed, that is, when the EG/CPU judges that the malfunction occurs in the SP/ECU 50, the EG/CPU judges "No" at the step 740 and then, proceeds to the step 760. At the step 760, the EG/CPU stops the operation of the engine 10 and then, proceeds to the step 795 where the EG/CPU terminates the routine.

As described above, even when the engine operation stop inhibition requesting signal is sent to the EG/ECU 30, if the engine operation stop condition is satisfied and the value of the mask flag Xmask is "1", the EG/CPU ignores (masks) the stop inhibition requesting signal and automatically stops the operation of the engine 20.

(4) Automatic Start of Engine Operation

Figure 8:
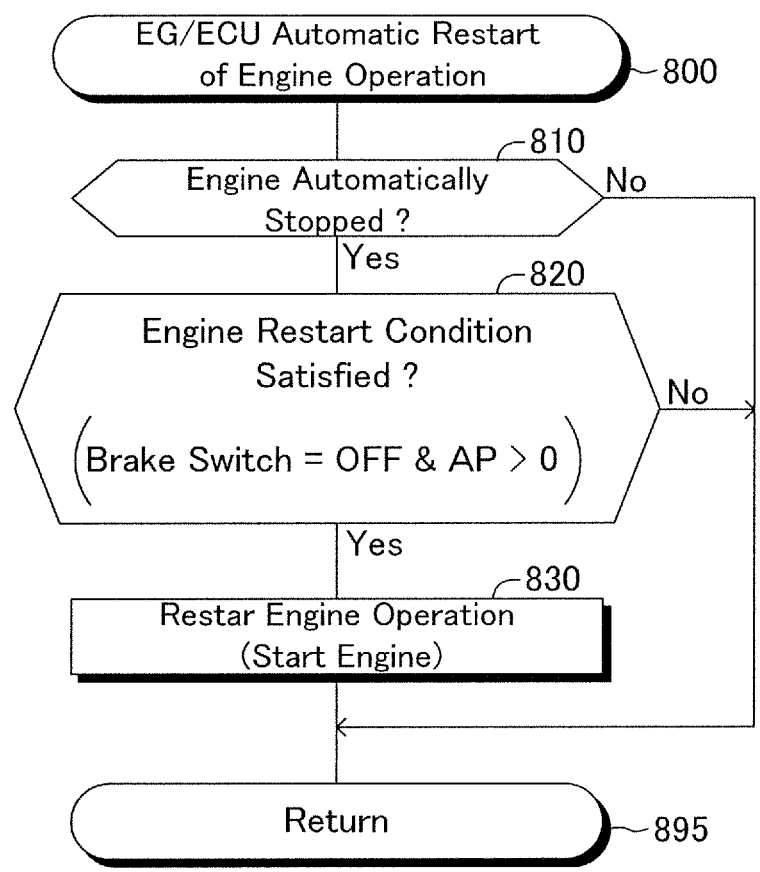
FIG. 8 is a flow chart showing an automatic engine operation restarting routine executed by the CPU of the engine control device shown in FIG. 1.

The EG/CPU is programmed to execute an engine operation automatically restarting routine shown in FIG. 8 by a flow chart every a predetermined time period elapses. Therefore, the EG/CPU starts the processes from the step 800 of FIG. 8 at a predetermined timing and then, proceeds to the step 810 where the EG/CPU judges if the operation of the engine 20 is being stopped (the operation of the engine 20 was automatically stopped by the process of the step 760). When the operation of the engine 20 is not automatically stopped, the EG/CPU judges "No" at the step 810 and then, proceeds directly to the step 895 where the EG/CPU terminates the routine.

On the other hand, when the operation of the engine 20 is being automatically stopped, the EG/CPU judges "Yes" at the step 810 and then, proceeds to the step 820 where the EG/CPU judges if an engine operation restart condition is satisfied. The engine operation restart condition is satisfied when all conditions described below are satisfied.

(Condition 4) The brake switch is under the OFF state. Namely, the brake pedal is not depressed.

(Condition 5) The acceleration pedal manipulation amount AP is larger than zero. Namely is, the acceleration pedal is depressed and thus, the acceleration request is generated.

When the engine operation restart condition is not satisfied at the process of the step 820 being executed, the EG/CPU judges "No" at the step 820 and then, proceeds directly to the step 895 where the EG/CPU terminates the routine.

On the other hand, when the engine operation restart condition is satisfied, the EG/CPU judges "Yes" at the step 820 and then, proceeds to the step 830 where the EG/CPU starts the operation of the engine 20. Then, the EG/CPU proceeds to the step 895 where the EG/CPU terminates the routine.

As described above, the engine control device 30 according to the embodiment described above is installed on the vehicle 10 equipped with the suspension control device 50 for driving the stepping motors 41c to 44c for changing a damping force of the shock absorbers 41b to 44b by increasing and/or decreasing the opening degree of the damping force control valves of the shock absorbers 41b to 44b which the suspension of the vehicle 10 comprises. The suspension control device 50 performs the initializing process for resolving the step-out of the stepping motors 41c to 44c by driving the stepping motors 41c to 44c when the initialization performing condition is satisfied.

The engine control device 30 has an engine control part (the EG/CPU). The engine control part is programmed to automatically stop the operation of the engine 20 when the predetermined engine operation stop condition is satisfied (refer to the steps 220 and 260 of FIG. 2 and the steps 720 and 760 of FIG. 7). Further, the engine control part is programmed to automatically start the operation of the engine 20 when the predetermined engine operation restart condition is satisfied (refer to the steps 820 and 830 of FIG. 8).

Figure 2:
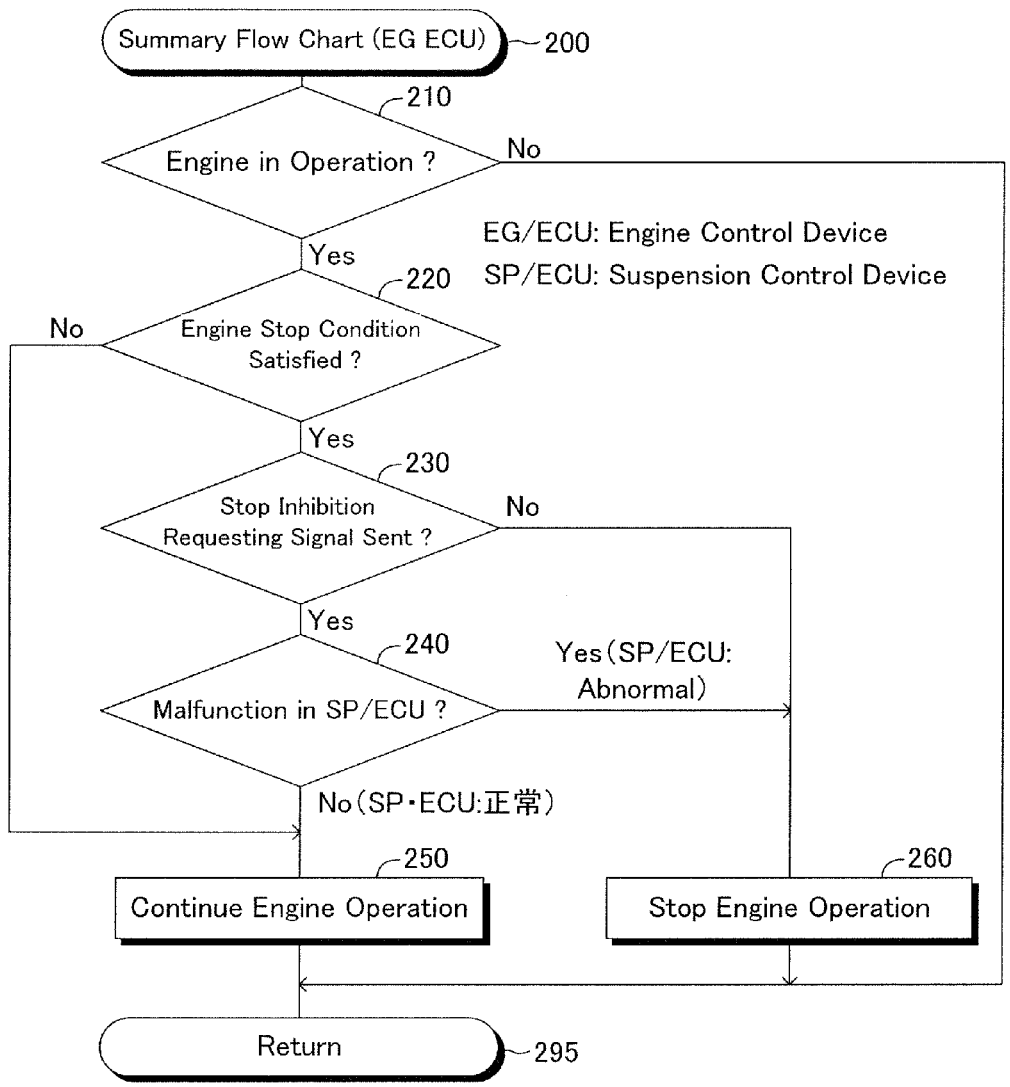
FIG. 2 is a flow chart showing a summary of the processes executed by a CPU of the engine control device shown in FIG. 1.

If the suspension control device 50 sends, to the engine control device 30, the stop inhibition requesting signal for inhibiting the automatic stop of the operation of the engine 20 in order to perform the initializing process, the engine control part is programmed to continue to operate the engine 20 even when the engine operation stop condition is satisfied (refer to the steps 220, 230 and 250 of FIG. 2 and the steps 720, 730 and 750 of FIG. 7).

Further, the engine control part is programmed to:
judge if a malfunction occurs in the suspension control device 50 (refer to the step 240 of FIG. 2, the steps 610 and 620 of FIG. 6 and the step 740 of FIG. 7); and ignore the stop inhibition requesting signal and stop the operation of the engine 20 when the engine control part judges that the malfunction occurs in the suspension control device 50 (refer to the judgment "Yes" at the step 240 of FIG. 2 and the judgment "No" at the step 740 of FIG. 7), even if the engine operation stop condition is satisfied and the stop inhibition requesting signal is sent to the engine control device 30 (refer to the steps 220, 230, 240 and 260 of FIG. 2 and the steps 720, 730, 740 and 760 of FIG. 7).

Thereby, even when the stop inhibition requesting signal is continued to be sent to the engine control device 30 due the malfunction of the suspension control device 50, the operation of the engine 20 can be stopped when the engine operation stop condition is satisfied. As a result, the increasing of the consumption of the fuel by the engine 20 can be prevented.

Further, the engine control part is programmed to judge if a malfunction occurs in the suspension control device 50 by using the stop inhibition requesting signal (refer to FIG. 6).

Furthermore, the suspension control device 50 is configured to send the stop inhibition requesting signal to the engine control device 30 during a particular time period (during a time period when the stop inhibition requesting signal needs to be sent to the engine control device 30 in order to perform the initializing process).

Furthermore, the engine control part is programmed to judge that a malfunction occurs in the suspension control device 50 when the stop inhibition requesting signal is sent to the engine control device 30 during a time period other than the particular time period.

More particularly, the suspension control device 50 is configured to:

(1) start sending the stop inhibition requesting signal when the running state of the vehicle 10 satisfies the predetermined running condition (refer to the step 310 of FIG. 3 and the time t2 of FIG. 4), (2) judge that the initialization performing condition is satisfied, when the speed SPD of the vehicle 10 becomes the first threshold speed SPDth1 or less after the running state of the vehicle 10 satisfies the predetermined running condition (refer to the step 330 of FIG. 3 and the time t4 of FIG. 4) and start the initializing process (refer to the step 340 of FIG. 3), and (3) finish sending the stop inhibition requesting signal when the initializing process is completed to be performed (refer to the step 350 and the step 360 of FIG. 3).

Furthermore, the engine control part is programmed to judge that a malfunction occurs in the suspension control device 50 when a situation where the stop inhibition requesting signal is being sent has continued for the first predetermined time period Tth1 or more since the initialization performing condition is satisfied (refer to the step 240 of FIG. 2 and FIG. 6).

Furthermore, the suspension control device 50 is configured to judge that the predetermined running condition is satisfied when the vehicle 10 has continued to run at the second threshold speed, which is higher than the first threshold speed, or higher for the second predetermined time period or longer (refer to the step 310 of FIG. 3 and the time t2 of FIG. 4).

Further, the engine control part is programmed to continue to ignore the stop inhibition requesting signal until the state of the ignition switch 32 of the vehicle 10 is changed from the ON state to the OFF state when the engine control part judges that the malfunction occurs in the suspension control device 50 (refer to the fact that "1" is continued to be set to the mask flag Xmask in FIGS. 5 and 6 and the mask flag Xmask is referred to at the step 740 in FIG. 7).

Furthermore, the engine control part is programmed to stop ignoring the stop inhibition requesting signal when the state of the ignition switch 32 is changed from the ON state to the OFF state and then, again to the ON state after the engine control part judges that a malfunction occurs in the suspension control device 50 (refer to the fact that the "0" is set to the mask flag Xmask in FIG. 5 and the mask flag Xmask is referred to at the step 740 of FIG. 7).

Therefore, the engine control device 30 according to the embodiment described above can avoid that the engine 20 is continued to be operated due to the occurrence of the malfunction in the suspension control device 50 when the condition of stopping the operation of the engine 20 is satisfied. As a result, the engine control device 30 can avoid the increasing of the fuel consumption of the engine 20.

It should be noted that the invention is not limited to the embodiment described above and various modifications can be employed within the scope of the invention. For example, the EG/ECU 30 according to the embodiment described above judges if a malfunction occurs in the SP/ECU 50 by using the stop inhibition requesting signal. However, it may be judged if a malfunction occurs in the SP/ECU 50 by the other method.

In particular, the SP/ECU 50 may be programmed to send a pulse signal having a particular pattern through the CAN to the EG/ECU 30 every a constant time period elapses. In this case, the EG/ECU 30 may be programmed to judge that the malfunction occurs in the SP/ECU 50 when the pulse signal is not sent to the EG/ECU 30 every the constant time period elapses.

Alternatively, if the EG/ECU 30 and the SP/ECU 40 can identify a certain time period (that is, the particular time period) separately (that is, without the information exchange by the communication) and the SP/ECU 50 is programmed to drive the actuator during the particular time period and send the stop inhibition requesting signal to the EG/ECU 30, the EG/ECU 30 may be programmed to judge that the malfunction occurs in the SP/ECU 50 when the EG/ECU 30 receives the stop inhibition requesting signal during a time period other than the particular time period. Further, the EG/ECU may be connected to the vehicle speed sensor 33 and detect the vehicle speed SPD directly or may be programmed to acquire the vehicle speed SPD from the other ECU not shown (for example, a meter ECU) through the CAN.

What is claimed is:

1. An engine control device applied to a vehicle equipped with:
   a stepping motor for changing a damping force of a shock absorber, which a suspension of said vehicle comprises, by increasing and/or decreasing the opening degree of a damping force control valve of the shock absorber;
   a suspension control device for driving said stepping motor, which performs an initializing process for resolving a step-out of said stepping motor by driving said stepping motor when a predetermined initialization performing condition is satisfied; and
   an internal combustion engine,
   said engine control device comprising an engine control part programmed to:
   automatically stop the operation of said engine when a predetermined engine operation stop condition is satisfied; and
   automatically start the operation of said engine when a predetermined engine operation restart condition is satisfied,
   wherein said engine control part is programmed to:
   judge if a malfunction occurs in said suspension control device;
   continue the operation of said engine when a stop inhibition requesting signal for inhibiting the automatic stop of the operation of said engine is sent to the engine control device in order to perform said initializing process and said engine control part judges that no malfunction occurs in said suspension control device even if said engine operation stop condition is satisfied; and
   ignore said stop inhibition requesting signal and automatically stop the operation of said engine when said engine operation stop condition is satisfied and said engine control part judges that the malfunction occurs in said suspension control device even if said stop inhibition requesting signal is sent to the engine control device.

2. The engine control device of claim 1, wherein:
   said engine control part is programmed to judge if a malfunction occurs in said suspension control device by using said stop inhibition requesting signal.

3. The engine control device according to claim 2, wherein:
   said initialization performing condition is satisfied when the speed of said vehicle becomes a first threshold speed or less after the running state of said vehicle satisfies a predetermined running condition,
   said suspension control device is configured to:
   start sending said stop inhibition requesting signal when the running state of said vehicle satisfies said predetermined running condition, and
   finish sending said stop inhibition requesting signal when said initializing process is completed to be performed, and
   said engine control part is programmed to judge that a malfunction occurs in said suspension control device when a situation where the speed of said vehicle is said first threshold speed or less and said suspension control device sends said stop inhibition requesting signal continues for a first predetermined time period or more.

4. The engine control device according to claim 2, wherein:
   said initialization performing condition is satisfied when the speed of said vehicle becomes a first threshold speed or less after the running state of said vehicle satisfies a predetermined running condition,
   said suspension control device is configured to:
   start sending said stop inhibition requesting signal when the running state of said vehicle satisfies said predetermined running condition, and
   finish sending said stop inhibition requesting signal when said initializing process is completed to be performed, and said engine control part is programmed to judge that a malfunction occurs in said suspension control device when said suspension control device continues to send said stop inhibition requesting signal until after a time period longer than or equal to a first predetermined time period has passed since said initialization performing condition is satisfied.

5. The engine control device according to claim 3, wherein:
said predetermined running condition is satisfied when said vehicle has continued to run at a second threshold speed larger than said first threshold speed or higher for a time period longer than or equal to a second predetermined time period.

6. The engine control device according to claim 1, wherein:
said engine control part is programmed to ignore said stop inhibition requesting signal until a state of an ignition switch of said vehicle is changed from an ON state to an OFF state after said engine control part judges that the malfunction occurs in said suspension control device.

7. The engine control device according to claim 6, wherein:
said engine control part is programmed to stop ignoring said stop inhibition requesting signal when the state of said ignition switch is changed from the ON state to the OFF state and then, to the ON state after said engine control part judges that the malfunction occurs in said suspension control device.

8. The engine control device according to claim 4, wherein:
said predetermined running condition is satisfied when said vehicle has continued to run at a second threshold speed larger than said first threshold speed or higher for a time period longer than or equal to a second predetermined time period.

9. The engine control device according to claim 2 wherein:
said engine control part is programmed to ignore said stop inhibition requesting signal until a state of an ignition switch of said vehicle is changed from an ON state to an OFF state after said engine control part judges that the malfunction occurs in said suspension control device.

10. The engine control device according to claim 3 wherein:
said engine control part is programmed to ignore said stop inhibition requesting signal until a state of an ignition switch of said vehicle is changed from an ON state to an OFF state after said engine control part judges that the malfunction occurs in said suspension control device.

11. The engine control device according to claim 4 wherein:
said engine control part is programmed to ignore said stop inhibition requesting signal until a state of an ignition switch of said vehicle is changed from an ON state to an OFF state after said engine control part judges that the malfunction occurs in said suspension control device.

12. The engine control device according to claim 5 wherein:
said engine control part is programmed to ignore said stop inhibition requesting signal until a state of an ignition switch of said vehicle is changed from an ON state to an OFF state after said engine control part judges that the malfunction occurs in said suspension control device.

13. The engine control device according to claim 8 wherein:
said engine control part is programmed to ignore said stop inhibition requesting signal until a state of an ignition switch of said vehicle is changed from an ON state to an OFF state after said engine control part judges that the malfunction occurs in said suspension control device.

14. The engine control device according to claim 9, wherein:
said engine control part is programmed to stop ignoring said stop inhibition requesting signal when the state of said ignition switch is changed from the ON state to the OFF state and then, to the ON state after said engine control part judges that the malfunction occurs in said suspension control device.

15. The engine control device according to claim 10, wherein:
said engine control part is programmed to stop ignoring said stop inhibition requesting signal when the state of said ignition switch is changed from the ON state to the OFF state and then, to the ON state after said engine control part judges that the malfunction occurs in said suspension control device.

16. The engine control device according to claim 11, wherein:
said engine control part is programmed to stop ignoring said stop inhibition requesting signal when the state of said ignition switch is changed from the ON state to the OFF state and then, to the ON state after said engine control part judges that the malfunction occurs in said suspension control device.

17. The engine control device according to claim 12, wherein:
said engine control part is programmed to stop ignoring said stop inhibition requesting signal when the state of said ignition switch is changed from the ON state to the OFF state and then, to the ON state after said engine control part judges that the malfunction occurs in said suspension control device.

18. The engine control device according to claim 13, wherein:
said engine control part is programmed to stop ignoring said stop inhibition requesting signal when the state of said ignition switch is changed from the ON state to the OFF state and then, to the ON state after said engine control part judges that the malfunction occurs in said suspension control device.

* * * * *